(12) United States Patent
Gleim

(10) Patent No.: US 6,337,553 B1
(45) Date of Patent: Jan. 8, 2002

(54) CIRCUIT ARRANGEMENT AND METHOD FOR OPERATING AND ELECTRICAL MOTOR

(75) Inventor: Günter Gleim, Villingen-Schwenningen (DE)

(73) Assignee: Deutsche Thomson-Brandt GmbH, Villengen-Schwenningen (DE)

( * ) Notice: Subject to any disclaimer, the term of this patent is extended or adjusted under 35 U.S.C. 154(b) by 0 days.

(21) Appl. No.: 09/080,708

(22) Filed: May 18, 1998

(30) Foreign Application Priority Data

May 23, 1997 (DE) .......................................... 197 21 490

(51) Int. Cl.⁷ .............................................. G05B 11/18
(52) U.S. Cl. ...................... 318/590; 318/778; 318/434; 318/430; 318/59; 318/272; 318/275
(58) Field of Search ................................ 318/590, 778, 318/434, 430, 59, 272, 275

(56) References Cited

U.S. PATENT DOCUMENTS 4,277,734 A * 7/1981 Uhrner et al. .............. 318/758
5,712,550 A * 1/1998 Boll et al. ................... 318/434

FOREIGN PATENT DOCUMENTS

| DE | 3423329 A1 | 1/1986 | ............. H02P/7/29 |
| DE | 3536416 A1 | 4/1987 | ............. H02P/7/29 |
| DE | 3810693 A1 | 11/1989 | ............. H02P/5/00 |
| DE | 3827509 A1 | 2/1990 | ............. H02P/5/06 |
| EP | 048 405 A2 | 3/1982 | ............. H02P/8/00 |
| EP | 243 625 A2 | 11/1987 | ............. H02P/6/02 |
| JP | 60-113510 | 6/1985 | ............. H03G/3/20 |

* cited by examiner

*Primary Examiner*—Karen Masih
(74) *Attorney, Agent, or Firm*—J. S. Tripoli; E. P. Herrmann

(57) ABSTRACT

A circuit arrangement with a digital controller for operating an electric motor and a method for starting an electric motor are disclosed. Electric motors require a considerably higher current immediately after they have been switched on and during the running-up phase because of the inductance of the motor windings. In order to increase the control sensitivity of the controller for the normal operation, the control range of a digital controller is switched over into a higher current range for the running-up phase. For the normal operation of the motor, the control range of the controller is switched back again into a lower current range. As a result, the control sensitivity of the controller is completely available for the normal operation of the motor.

6 Claims, 1 Drawing Sheet

CIRCUIT ARRANGEMENT AND METHOD FOR OPERATING AND ELECTRICAL MOTOR

The present invention relates to a circuit arrangement with a digital controller for operating an electric motor, and to a corresponding method.

In electric motors, it is known that they require a considerably higher current after they have been switched on and during the running-up phase owing to the inductances of the motor windings. If the motor is driven by means of a digital controller, the control range of the controller must comprise both the normal operation and the running-up phase of the motor.

The object of the present invention is to specify a circuit arrangement with a digital controller which has increased control sensitivity during the normal operation of the motor, and to specify a corresponding method.

The circuit arrangement according to the invention switches the control range of the digital controller over into a higher current range for the running-up phase. Then, for the normal operation of the motor, the control range of the controller is switched back again into a lower current range. As a result, the control sensitivity of the controller is completely available for the normal operation of the motor. In addition, a high current is made available for a rapid start for the running-up phase.

The circuit arrangement can contain, for example, a special digital-to-analogue converter, whose sensitivity can be switched over by means of a control signal. In a further exemplary embodiment, a multiplexer is connected between the digital controller and a downstream digital-to-analogue converter. The digital-to-analogue converter has a higher resolution than the controller, with the result that the digital signals of the controller can be switched through to various ranges of the digital-to-analogue converter by means of the multiplexer.

A control signal is required to switch over between running-up phase and normal operation. This signal can be derived, for example, by means of a sensor which is already present, is arranged on the motor and generates the synchronization signals for controlling the motor and thus detects the speed of the motor.

Applications of the invention result, in particular, for video recorders, camcorders, and further domestic appliances with electric motors.

The invention and advantageous exemplary embodiments are explained below by way of example with reference to the schematic drawings illustrated in FIGS. 1 to 3, of which:

Figure 1:
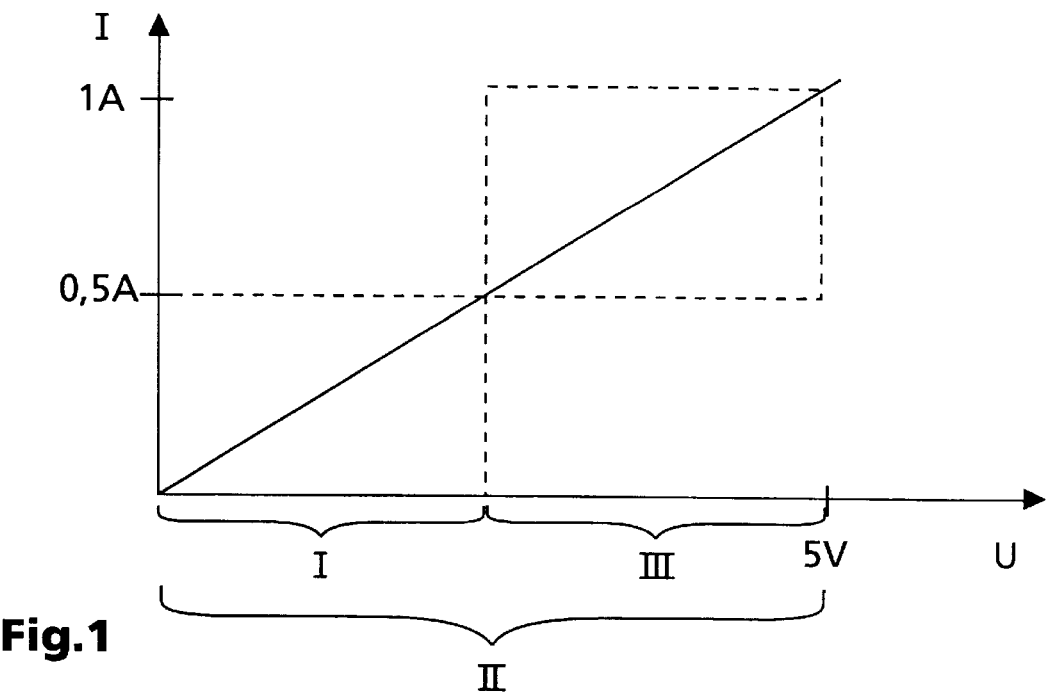
FIG. 1 shows a current/voltage characteristic curve for a motor.

FIG. 1 illustrates an exemplary current/voltage characteristic curve for an electric motor which operates in a range from 0 to 1 A/5 V. During normal operation, illustrated as phase I in FIG. 1, the motor is operated in a range between 0 and 0.5 A. In the starting phase or running-up phase, the motor can, however, be operated with currents up to 1 ampere. As a result, after the appropriate device has been switched on, the motor reaches its normal speed of revolution considerably more quickly. The associated digital controller of the motor must therefore be able to process the entire range between 0 and 1 A/5 V. For this reason, in the invention, the range I of the controller is switched over into a higher current range III, between 0.5 and 1 ampere in FIG. 1. This is possible without restrictions, since relatively low currents are not required during the running-up phase. Towards the end of the running-up phase, the range III is then switched over back into the range I. This permits a significantly better control of the rotational speed of the motor during normal operation, since the resolution of the digital controller in the range I is better by a factor of 2 than in the range II, which is composed of range I and range III.

Figure 2:
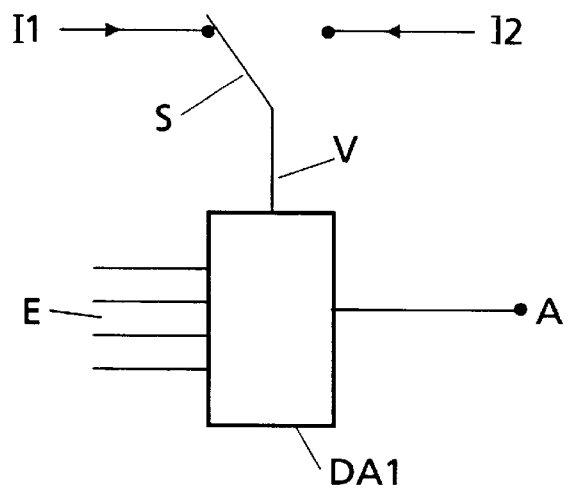
FIG. 2 shows the wiring of a multiplying digital-to-analogue converter.

The circuit arrangement with a digital controller for operating an electric motor can contain, for example, a multiplying digital-to-analogue converter (MDAC) DA1, whose sensitivity can be switched over. In the exemplary embodiment in FIG. 2, said converter (MDAC) has a parallel digital input E which has 4 bits and whose input signal is converted into an analogue output signal and output at an output A. The output signal of the digital-to-analogue converter DA1 is connected to the input of a driver stage of the motor (not illustrated). The digital-to-analogue converter DA1 also contains an additional input V, by means of which the output signal A can be varied linearly. Via a switch S, a voltage I1 is applied to the input V during the running-up phase and a voltage I2 during the normal operation of the motor. The two voltages I1 and I2 can be in a ratio of, for example, 2 to 1, but may also be in any other ratio depending on the properties of the motor.

Figure 3:
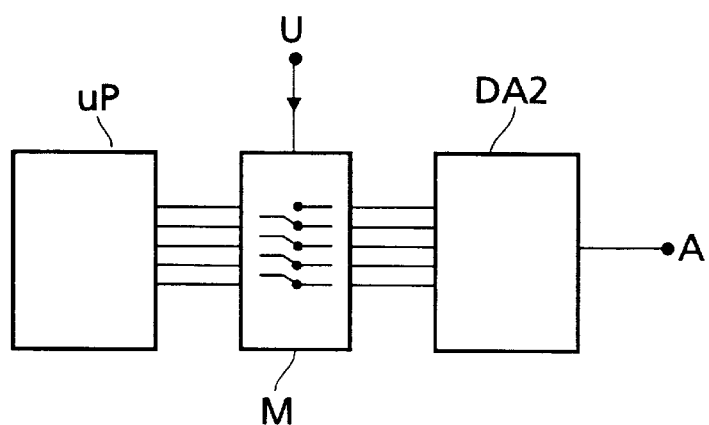
FIG. 3 shows a circuit arrangement with a multiplexer for operating a motor.

FIG. 3 illustrates a circuit arrangement with a digital controller $\mu$P and a digital-to-analogue converter DA2, between which a multiplexer M is arranged. The controller $\mu$P has a digital 4-bit output whose signals are applied to a corresponding 4-bit input of the multiplexer M. The digital-to-analogue converter DA2 has a parallel 5-bit input. By means of a control signal U, the multiplexer M can connect through the four parallel inputs to the four lower outputs or the four higher outputs. The control signal U is selected in such a way that, during the running-up phase of the motor, the four high-order bits of the input of the digital-to-analogue converter are connected to the digital controller $\mu$P and, during normal operation, the four low-order bits of the digital-to-analogue converter DA2 are connected to said digital controller $\mu$P. In this way, the 4-bit resolution of the controller $\mu$P is completely maintained for the normal operation and it is also made possible for the motor to be supplied during the running-up phase with a current which is higher by a factor of 2.

The embodiment of FIG. 3 shows a circuit arrangement in which the current range is switched by a factor of 2 according to FIG. 1. Other current ranges can also be selected when using a digital-to-analogue converter with more inputs and selecting different bits of the input of said converter.

Electric motors which are used in electronic entertainment appliances are usually d.c. motors or low-power synchronous motors with preferably three-phase windings. In this case, the current range according to the invention is switched over for all 3 phases during the running-up phase in each case. The invention is not restricted to the aforesaid exemplary embodiments but rather can also be used in other technical fields by a person skilled in the art of electric motors.

What is claimed is:

1. A circuit arrangement for operating an electric motor, comprising:

a digital controller with a parallel output for providing drive signals for driving said motor;

a digital-to-analog converter for converting said drive signals into analog signals, said digital-to-analog converter having a higher resolution than said digital controller;

a multiplexer being coupled between said digital controller and said digital-to-analog converter, having an input for a control signal, for switching the control range of said controller to a higher current range of said drive signals during a run-up phase of said motor and for switching the control range of said controller to a lower, normal current range after said run-up phase.

2. The circuit arrangement set forth in claim 1 further comprising:

a sensor arranged for detecting rotational speed of said motor, and which generates said control signal for switching between said running-up phase and said normal operation.

3. The circuit arrangement set forth in claim 2, further characterised in that said sensor generates synchronisation signals for controlling said motor.

4. A circuit arrangement for operating an electric motor, comprising:

a digital controller with a parallel output for providing drive signals for driving said motor, a digital-to-analog converter for converting said drive into analog drive signals, and having an additional input for conditioning said converter to switch between a higher range of analog drive signals and a lower, normal range of analog drive signals;

a motor driver stage coupled to said digital-to-analog converter; and wherein said digital-to-analog converter is switched to provide said higher range of analog drive signals during a run-up phase of said motor, and switched to provide said lower, normal range of analog drive signals otherwise.

5. The circuit arrangement set forth in claim 4, characterised in that said digital-to-analog converter is a multiplying digital-to-analog converter with provision for switching its sensitivity.

6. The circuit arrangement set forth in claim 5, further comprising:

a sensor arranged proximate said motor for detecting rotational speed of said motor, and generating said control signal for switching sensitivity of said digital to analog converter between said run-up phase and said normal operation.

* * * * *